Dec. 22, 1936.  W. H. CAMPBELL  2,065,426
ELECTRICAL INDICATOR AND TACHOMETER
Filed Dec. 24, 1934  2 Sheets—Sheet 1

Inventor
Walter H. Campbell,
By Victor J. Evans &Co.
Attorney

Dec. 22, 1936. W. H. CAMPBELL 2,065,426
ELECTRICAL INDICATOR AND TACHOMETER
Filed Dec. 24, 1934 2 Sheets-Sheet 2
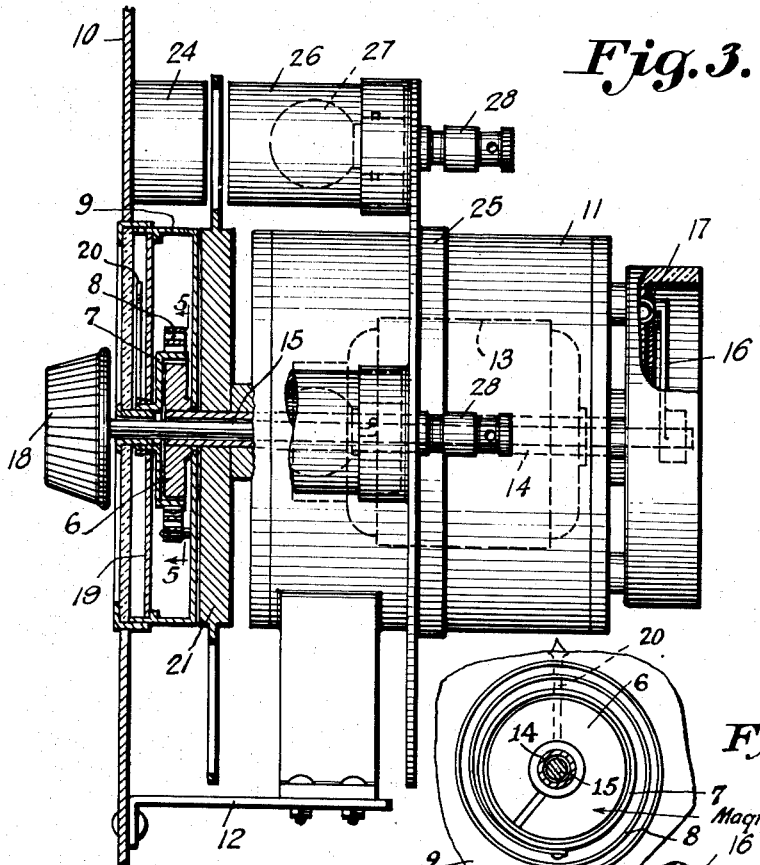
Fig. 3.
Fig. 5.
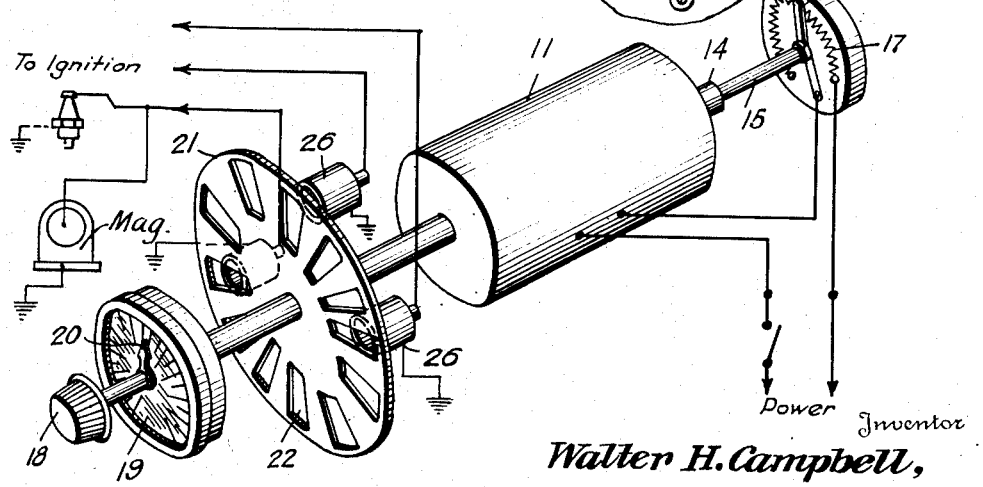
Fig. 4.
Inventor
Walter H. Campbell,
By Victor J. Evans & Co.
Attorney Patented Dec. 22, 1936

2,065,426

UNITED STATES PATENT OFFICE 2,065,426

ELECTRICAL INDICATOR AND TACHOMETER

Walter H. Campbell, Osborn, Ohio

Application December 24, 1934, Serial No. 759,077

1 Claim. (Cl. 177—311)

The invention relates to electrical testing apparatus and has for its general object the provision of a novel device for giving a direct indication of the condition and status of electrical circuits, especially those of ignition though the use of the device is not limited to such purposes as it is capable of employment under widely different circumstances, for example in coordinating several timing circuits, comparing control circuits, and more particularly the inspection of the condition, the actuation and timing of ignition circuits such as exist in the individual and collective actions of motor vehicles regardless of whether the same be operated on land, on water or in air.

An important object of the invention is to provide an electrical indicating device particularly adapted for use in connection with synchronizing the speed of a plurality of motors of a multi-motored airplane, it being known that such motors must be synchronized as regards their speed in order to prevent vibration, to obtain maximum efficiency and to give the correct control to the ship.

Another object of the invention is to provide an apparatus of this character operating on the stroboscopic principle for indicating the actual speed as well as the relative speed at which a plurality of motors are operating.

A more specific object is to provide a device of this character which may be connected with a plurality of motors, by employing a plurality of indicators, that is one indicator on each motor or in each spark plug circuit, whereby all motors can be readily regulated to operate in synchronism and any or all can be adjusted to the desired actual and relative speed.

An additional object is to provide a device of this character which will be simple, inexpensive, compact, light in weight, easily installed, operated and serviced very readily, and which will therefore be a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 3 is a view partly in side elevation and partly in section, and

Figure 4 is a diagrammatic perspective view.

Figure 1:
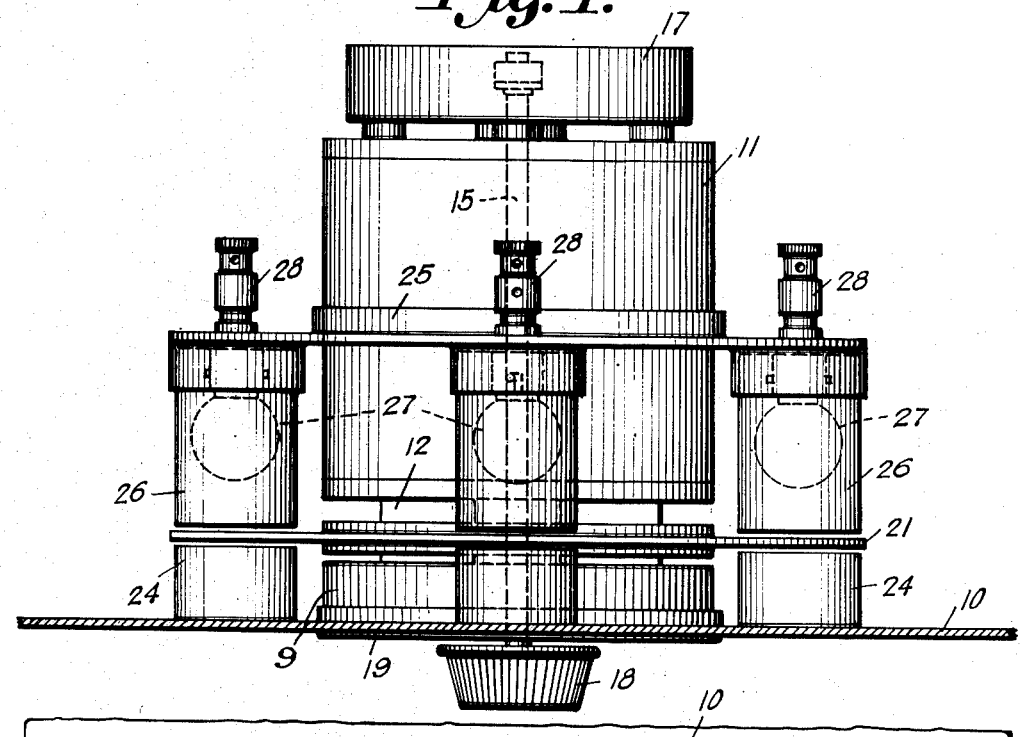
Figure 1 is a plan view of the apparatus.
Figure 2:
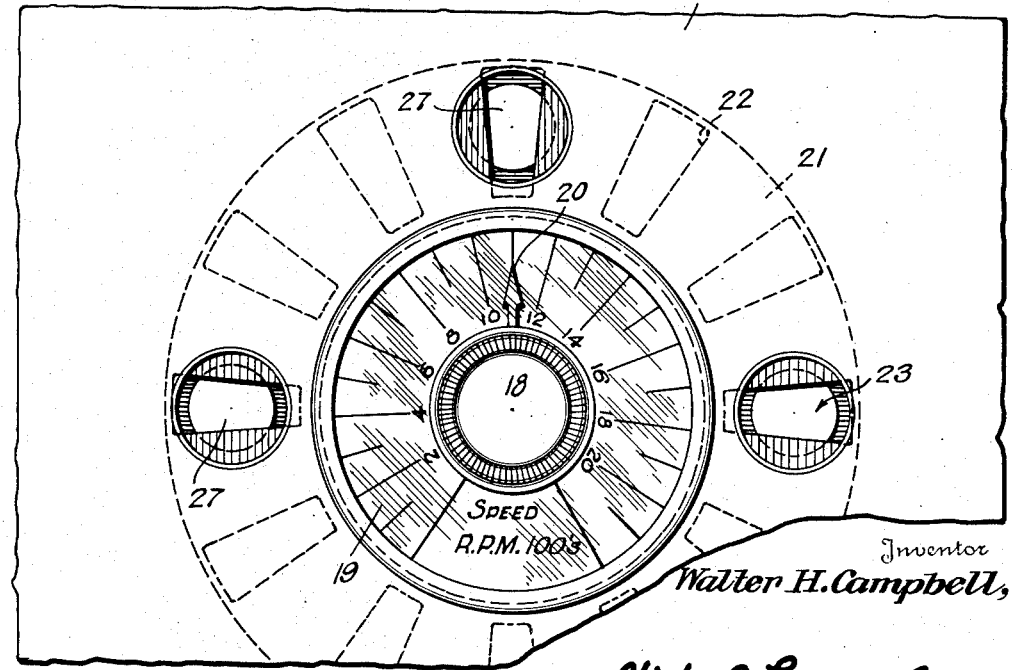
Figure 2 is a front elevation thereof.

Referring more particularly to the drawings it will be observed that I have shown the device of such construction that it may be readily mounted upon the rear of a panel 10 so that it may be located conveniently to the operator, for instance the pilot of an airplane, in such position as to be easily inspected as the occasion arises. The device is represented as including an electric motor 11 of appropriate type having its casing mounted upon a bracket 12 secured to the rear of the panel. The motor has its armature 13 secured upon a hollow shaft 14 through which extends a shaft 15 carrying a contact arm 16 movable over a rheostat 17. The shaft 15 projects through the panel 10 and is equipped in front of the same with an operating knob 18 by means of which the contact arm 16 may be moved over the rheostat for the purpose of regulating the resistance in the motor circuit and consequently the motor speed. On the panel is a dial 19 with which cooperates a pointer 20 of a conventional magnetic tachometer including a magnetic disk 6 fixed to the motor shaft 14 and producing a drag on a flanged disk 7 to which the pointer 20 is fixed, a spiral spring 8 being connected at one end to the disk and at the other to the casing 9, as shown in Figure 5. I do not wish to be limited in this particular respect.

Fixed upon the hollow shaft 14 so as to rotate therewith and located rearwardly of the speedometer mechanism, is a disk 21 provided with a circular series of openings 22. The panel itself is formed with a plurality of similar openings 23, here represented as three in number, with which the openings 22 are adapted to register as the disk is rotated. Mounted in the rear of the panel at each of the openings 23 therein is a hood 24, and carried by a support 25 mounted on the motor casing 11 are other hoods 26 which aline with the corresponding hoods 24 and which contain lamps 27 of the luminous gas type, for instance the well known neon variety. These lamps are connected with terminals 28 of the locking type such as are used for making electrical connections on airplanes or other places where they must be secured against loosening as the result of vibration. It will be noted that the respective hoods 24 and 26 are spaced apart sufficiently to accommodate the disk 21. Of course they operate to shield the light from the lamps and to prevent it from becoming diffused. The hoods 26 serve an additional purpose, namely they provide exterior electrodes for the tubes in view of the fact that they are grounded onto the motor frame. The tube electrodes are connected in circuit with the ignition systems of the motors.

Assuming that the device is to be used in connection with a three-motor airplane, the terminals 28 of the respective tubes 27 are connected with one of the spark plugs of the respective motors. When the plane motors are started, the electrodes of the tubes 27 become incandescent and the tubes are therefore rendered luminous at predetermined intervals depending upon the speed at which the respective motors are operating. As the disk 21 is secured to and rotates with the shaft 14, it will be clear that when the motors are operating in synchronism with the electric motor 11 the flashes of light from the tubes 27 will occur when the openings 22 are opposite the tubes. If all of the motors are operating in synchronism, the lights will be visible through the openings 23 and will appear stationary, in accordance with the well known stroboscopic principle. If one of the motors should be operating at a slower speed than the shaft 14 the light flashes will appear to move clockwise and if the motor is operating faster than the shaft 14 the light flashes for that motor will appear to move counter-clockwise. It will therefore be seen that it is a relatively simple matter for the operator to speed up or slow down the motors, by means of the usual throttle, until all of the lights appear stationary whereupon he will be assured that all the motors are synchronized. Owing to the provision of the dial 19 and pointer 20 the operator may ascertain at a glance the actual speed of the motors.

If preferred, the position of the disk 21 on the shaft 14 may be adjusted so that the openings 22 in the disk will be out of alinement with the tubes 27 when they are rendered luminous. In such an instance, when the motors are all operating in synchronism, none of the light flashes will be visible. However, should one of the motors become out of synchronism the light flashes of that particular motor will become visible. It will therefore be apparent that it requires no change other than the setting of the disk 21 in a slightly different position on the shaft 14 to operate the device in this manner. In this modified arrangement it will be apparent that if one light becomes visible through the openings the speed of that motor may be increased or decreased until the flash is no longer visible. It is intended that the openings 22 in the disk and 23 in the panel be only of sufficient size to enable the operator to see the flashes and, if desired, different colored lights may be used for the different motors.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claim hereunto appended.

Having thus described the invention, I claim:

In a device for synchronizing gas engines, a panel, an electric motor, a bracket supporting the electric motor upon the rear of the panel, an armature for the motor, an elongated hollow shaft for the armature, an inner shaft rotatably mounted in the hollow shaft, a contact arm carried by the inner shaft, a rheostat mounted on the inner shaft at the rear of the motor, said inner shaft projecting through the front of the panel, a knob on the front end of the inner shaft by means of which said contact arm may be moved upon the rheostat to regulate the motor speed, a magnetic tachometer connected to the hollow shaft in rear of said knob and exposed through an opening in the panel, a stroboscopic disk fixed on the hollow shaft in rear of the tachometer and provided with a circular series of openings, the panel being formed with a plurality of similar openings with which the first named openings are adapted to register when the disk is rotated, hoods mounted on the rear of the panel at respective ones of the openings in the panel, hoods mounted on the motor and aligning with the hoods on the panel, lamps in the hoods on the motor, the hoods of the panel and the hoods of the motor being spaced apart sufficiently to receive said stroboscopic disk between them, and terminals for the lamps adapted to be connected with ignition devices of respective gas engines.

WALTER H. CAMPBELL.